United States Patent [19]

Naunapper et al.

[11] Patent Number: 4,644,665

[45] Date of Patent: Feb. 24, 1987

[54] PROCESS FOR SUPERVISING AND/OR CONTROLLING OF PHYSICAL TREATMENT PROCESSES AND BIOREACTIONS IN VENTILATION SYSTEMS AS WELL AS DEVICE FOR EXECUTING THE PROCESS

[75] Inventors: Dietmar Naunapper, Breisach-Oberrimsingen; Gunter Braun, Grenzach-Wyhlen, both of Fed. Rep. of Germany

[73] Assignee: Firma Glatt GmbH, Binzen, Fed. Rep. of Germany

[21] Appl. No.: 616,564

[22] Filed: May 10, 1984

[51] Int. Cl.[4] .............................................. F26B 3/08
[52] U.S. Cl. .......................................... 34/26; 34/48; 34/50; 34/54; 73/336.5; 118/303; 118/663; 427/213; 324/61 R
[58] Field of Search ................... 34/48, 50, 53, 54, 26; 73/336.5; 118/19, 58, 303, 663; 427/212, 213, 242; 236/44 E, 44 B; 374/28; 324/61 R, 61 P

[56] References Cited

U.S. PATENT DOCUMENTS

| | | | |
|---|---|---|---|
| 3,908,045 | 9/1975 | Alterman et al. | 427/213 |
| 3,909,954 | 10/1975 | Zoukourian | 34/54 |
| 4,221,058 | 9/1980 | Zagorzycki | 34/50 |
| 4,244,698 | 1/1981 | King et al. | 34/10 |
| 4,386,471 | 6/1983 | Bowrey et al. | 34/48 |
| 4,478,080 | 10/1984 | Bruce | 374/28 |
| 4,500,940 | 2/1985 | Kuisma et al. | 73/336.5 |
| 4,507,875 | 4/1985 | Hirsch et al. | 34/48 |

*Primary Examiner*—Albert J. Makay
*Assistant Examiner*—David W. Westphal
*Attorney, Agent, or Firm*—Fleit, Jacobson, Cohn & Price

[57] ABSTRACT

In a process, the humidity of at least the exhaust air is measured and used for the regulation of the product humidity of water activity during a treatment process. Therefore, it is possible to directly register the humidity taken on by the inlet air or charged onto it, and to draw a conclusion about the humidity content of the product. To register the humidity value, a measuring device with moisture testers in the inlet air channel and in the exhaust air channel is provided. Especially the moisture tester for the exhaust air is constructed as a bypass flow moisture tester in an intrinsically safe manner, so that it can be used even under ex-conditions. During drying procedures, the possible measuring of the humidity charge of the exhaust air from the drying process, the course can be exactly controlled. The moisture testers can be constructed as dew point testers, especially with capacitive measuring probes.

27 Claims, 9 Drawing Figures

PROCESS FOR SUPERVISING AND/OR CONTROLLING OF PHYSICAL TREATMENT PROCESSES AND BIOREACTIONS IN VENTILATION SYSTEMS AS WELL AS DEVICE FOR EXECUTING THE PROCESS

BACKGROUND OF THE INVENTION

The invention basically concerns a process for supervising and/or controlling of physical treatment processes and bioreactions in ventilation systems, preferably during granulating, instantizing, dragée making and film coating processes. The invention is also concerned with bioreaction and drying processes, in which inlet air or gas is fed in and exhaust air or gas let out, whereby at least the humidity of the exhaust air is measured.

For supervising such processes in the prior art, auxiliary or indirect values, such as the motion of the goods to be treated and/or the temperature, were measured and a change of the treatment process was planned, if necessary, based on these values. However, these indirect measurements can result in measuring errors.

It is also already known to measure the humidity of the exhaust air and possibly of the inlet air in drying processes during their final phase, where there are only slight changes in humidity per unit of time. However, measurement of the actual humidity charging of the air or the product during the treatment process is not possible using this technique.

Furthermore, a measuring device with two electrodes is known, with which the conductivity of the goods to be treated is measured during a coating process. Such a technique also permits conclusions about the degree of humidity in the goods being processed, especially about the amount of liquid bonding agent. In addition, it is proposed here that a temperature measuring probe is to register the degree of drying during a subsequent drying process. Apart from the contamination resulting from the direct contact by the measuring probe reaching into the treated goods, the technique presents further problems in that the measuring of the desired data takes place through several transmissions so that there is an increased possibility for errors in the result. In addition, during a change of charges, especially during a change to another type of goods to be treated, the change-over, calibration, etc., of the measuring instruments creates further problems.

Similar disadvantages exist also in humidity measuring processes using an infrared measuring technique. Conclusions about the existing moisture in the goods treated are drawn from reflexes on a surface water film, which can also have additional disadvantageous influences when there is high humidity in the air surrounding the treated goods.

SUMMARY OF THE INVENTION

Therefore, it is a primary object of the present invention to provide a process and a device for executing the process in which there is the possibility for continuous registration of the condition of the treated goods during a treatment process without direct contact, while, on the other hand, a measured value can be registered which is substantially in a direct relationship to the condition of the treated goods and permits an exact statement about the humidity content of the treated goods. In addition, changes of charges, even with different goods to be treated, should not influence the measurement.

To solve this problem in accordance with the teachings of the present invention, the measured value of the humidity is used as a control input for regulating the product humidity or the water activity during a treatment process.

Thus, the measured value is immediately used relative to the product, so that it is possible to precisely maintain a planned product humidity or a corresponding water activity per unit of time. This is particularly important in bioreaction processes, as small deviations in product humidity can lead to disturbances. Finally, it is possible, e.g., during a drying process, to draw conclusions about the moisture in the product to be dried during the whole duration of the process. Not only momentary moisture removal, but also the total amount of the removed water can be accurately registered and used for control purposes. The supervision and/or control during granulation and coating processes is also greatly simplified by the present invention, whereby the humidity charge in the processing air is registered and can be set or regulated to a desired value. An over-humidication or under-drying is thus avoided. In this manner, a considerably more exact control of the process, even with changing products, is possible with simultaneous reduction in costs.

The humidity of the exhaust air is suitably measured with the known condition of the inlet air, and used, if necessary while taking into account in calculating the humidity factors which influence the humidity such as spray rate, etc., for the regulation of the product humidity or the water activity during the treatment process. Thus, it is possible to obtain data which can be expressed as a humidity difference between inlet air and exhaust air per unit of time based on the humidity or water content remaining in the product. If there is a spray treatment, the humidity introduced by it is calculated in, so that it is still possible to draw conclusions on the respective product humidity.

Preferably, the absolute humidity of the exhaust air and inlet air is measured and used to control the process or the processes. Thus, the measuring expenditure is relatively small as the temperature does not have to be registered too.

The invention also is concerned with a device for executing a process to control the physical treatment processes and bioreactions in ventilation systems, preferably during granulation, instantizing, dragee making and film coating processes, as well as in bioreaction and drying processes, whereby a measuring device made up of at least one sensing probe and a signal comparator for registering the humidity content of the gas is provided at least at the exit point of the gas.

The device according to the invention is characterized especially by the fact that the measuring device contains a moisture tester or sensing probe, constructed as a bypass flow moisture tester, at least for the exhaust air or the expelled gas, constructed in an intrinsically safe manner.

With such a moisture tester, an exact registration of the humidity in the exhaust air is possible and thus also the exact dosage of the water activity in the treated goods, which is of special importance in bioreaction processes. The intrinsically safe construction of the moisture tester takes into account the danger of explosion present in connection with most of the treatment processes addressed by the process according to the invention.

In a preferred embodiment of the present invention, the measuring device has moisture probes which are fashioned for registering the absolute humidity and especially capacitive measuring probes, which are capable of working together with a heating device. The registration of the absolute humidity and the use of capacitive measuring probes for this purpose simplifies the construction of the measuring device, and, because of the use of a heating device, supersaturated air may be measured by shifting the dew point.

These and other objects will become apparent when the following detailed description is read with the following drawings, in which:

BRIEF DESCRIPTION OF THE DRAWINGS

FIG. 8b is the second part of the flow diagram started in FIG. 8a.

DETAILED DESCRIPTION OF THE PREFERRED EMBODIMENTS

Figure 1:
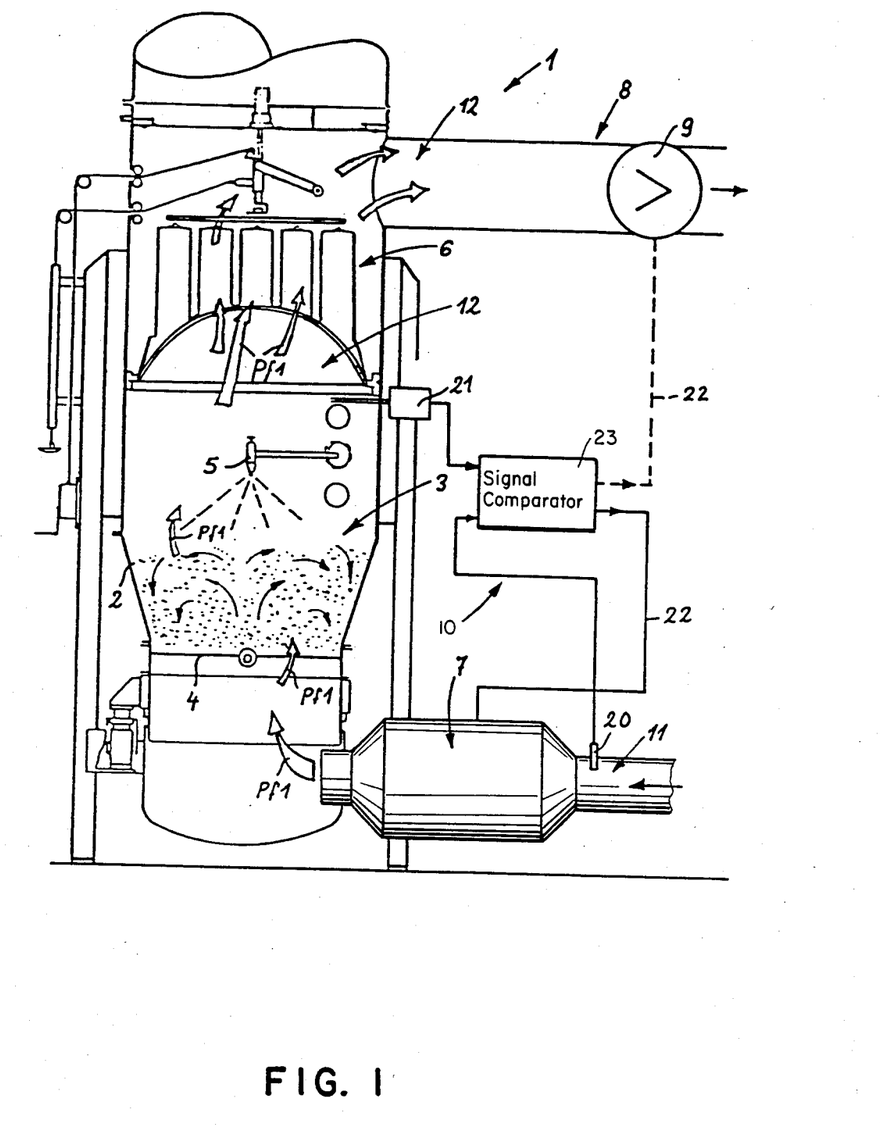
FIG. 1 is a partially cut-away front schematic view of a fluid column installation embodying the teachings of the present invention.

A fluid column installation 1, shown in FIG. 1, is used for the execution of drying, granulating, instantizing and film coating processes. For this purpose, inlet air (arrow Pf 1) is led in from below through a work column 2 and led off after flowing through a treatment area 3, located above the work column. The lower limit of the treatment area 3 is formed by a sieve-like bottom 4. At the upper end of the treatment area 3 there is a spray nozzle 5 for a spray treatment. At the upper end of the work column 2, a filter 6 with several filter elements can be seen.

The inlet air (Pf 1) is blown in at the lower end of the work column 2 by an inlet air pipe, designated as 7. The inlet air pipe may contain, e.g., a prefilter, a heater, possibly a cooling device, a fine filter and even a fresh air ventilator. For the suctionning off of the processing air, it is possible to arrange an exhaust air pipe 8 with second filter at the air exit point. It is also possible to use a suction fan 9.

For supervising, controlling or regulating the proposed treatment processes, there is a measuring device, generally designated as 10, for registering the moisture content of the gas or the air at the air inlet 11, as well as the moisture content of the air at the air exit point 12. The measuring device basically comprises moisture testing probes 20 and 21 whose signals are fed to a signal comparator 23 which, in FIG. 1, may be a subtractor.

From the moisture difference between the inlet air and exhaust air, the subtractor generates a signal from which it is possible to draw direct conclusions on the situation of the treatment process at a particular moment. It is particularly possible to determine at which rate humidity has been removed or added by the treatment process taking place in the treatment area. Based on such a change in moisture content, it is possible to control the process, whereby this control can be applied in various places for altering the moisture content in the treatment area 3. It is, e.g., possible to change the temperature or the amount of inlet air, or to alter the spray rate of the sprayed liquid coming from the spray nozzle 5. Thus, supervision and regulation is possible during certain treatment processes, such as spray granulation, sugar dragée making, film coating and similar, as well as controlling the drying processes by supervising the humidity of the air.

Figure 2:
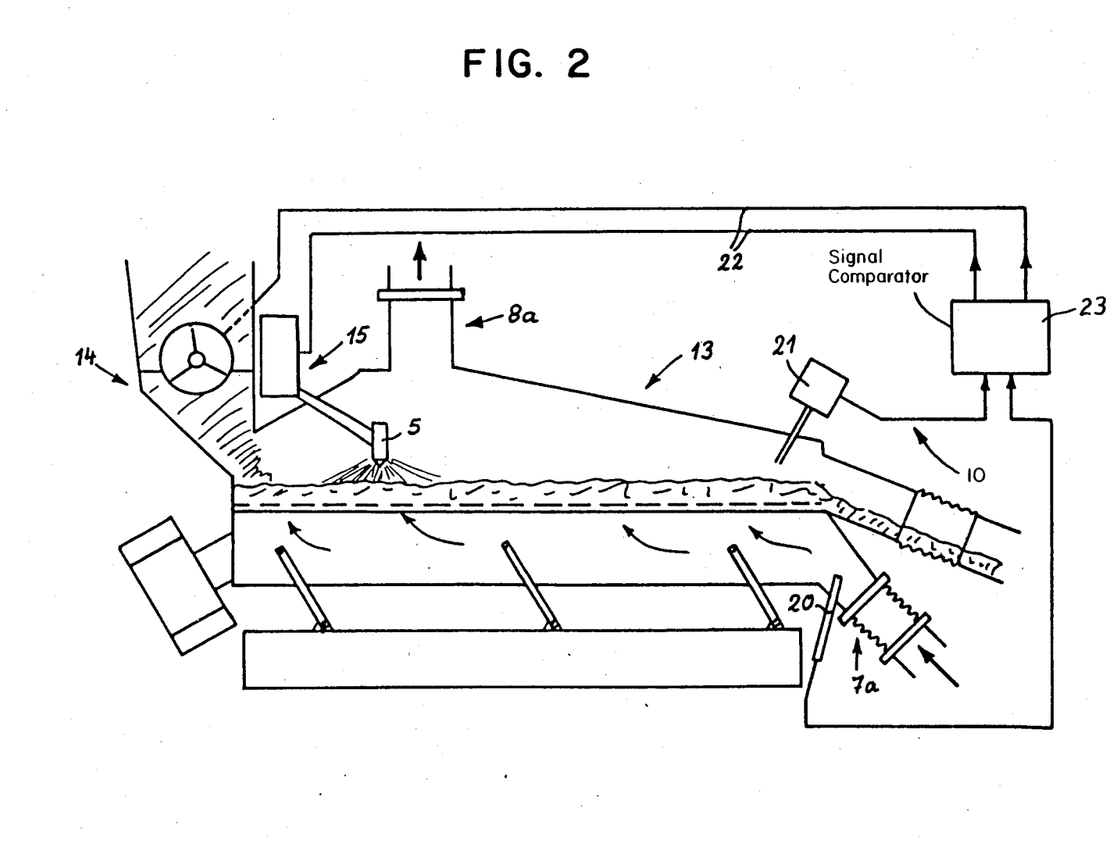
FIG. 2 is a lateral schematic view of a moving bed granulating and drying installation.

In FIGS. 1 through 5, various installations are shown in which the measuring devices 10 have their probes 20 and 21 arranged for inlet air humidity and exhaust air humidity. Thus, FIG. 1 shows a fluid column installation 1 for granulating or film coating processes. FIG. 2 shows a so-called moving bed dryer 13 with an inlet air pipe 7a and an exhaust air pipe 8a. In addition, FIG. 2 shows a material feed 14 as well as a spray device 15 with spray nozzle 5. The moving bed dryer can be used, with the spray device 15, also as a moving bed granulator.

Figure 3:
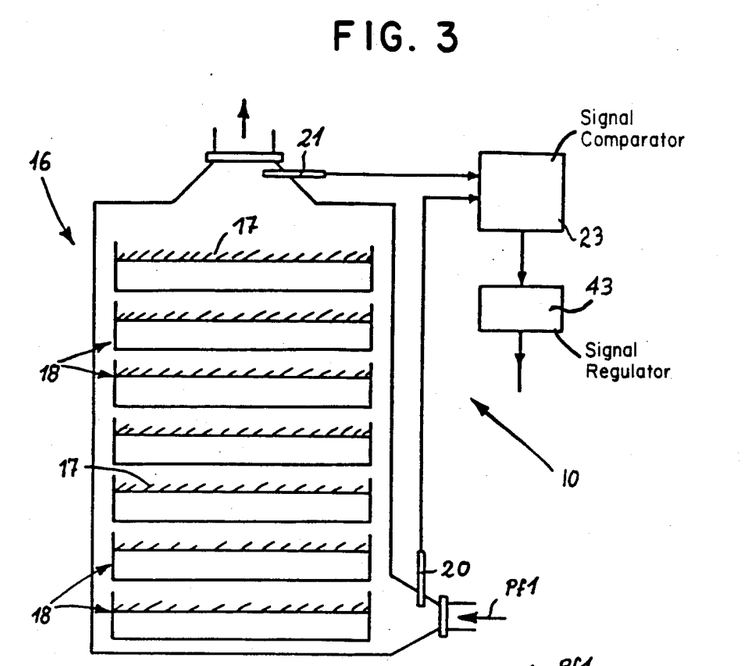
FIG. 3 is a schematic representation of a drying cabinet.

FIG. 3 shows a drying cabinet 16, in which the goods to be dried 17 are stored on trays 18.

Figure 4:
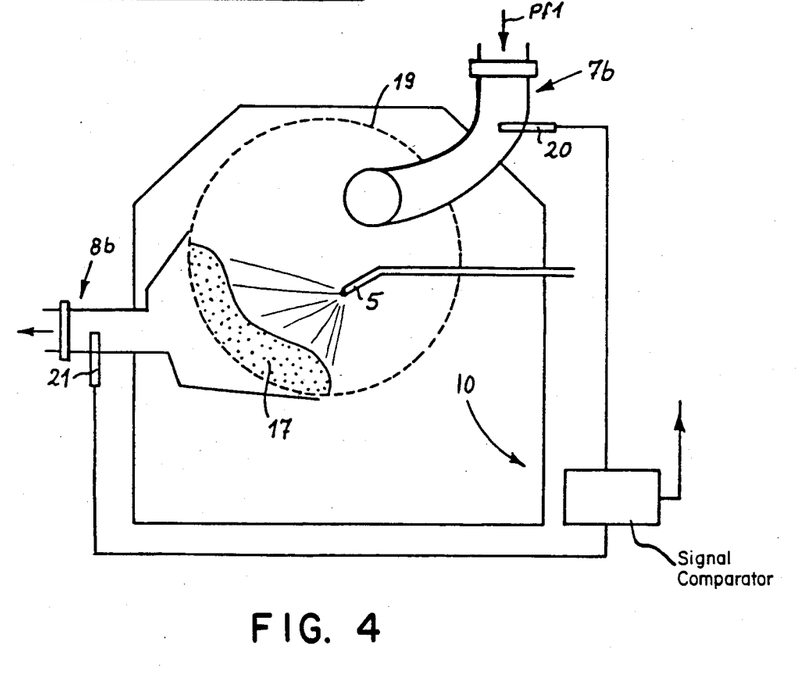
FIG. 4 is a schematic representation of a dragée making and film coating installation.

FIG. 4 shows an installation with a dragée making and film coating kettle 19, where air is led in through an air inlet pipe 7b, led through the goods to be treated 17 and led off through an exhaust air pipe 8b. Also in the installation according to FIG. 5, there is provided a dragée making and film coating kettle 19. However, in the embodiment of FIG. 5, a reciprocal air flow through the goods to be treated 17 is planned.

In the above models, the humidity of the inlet air and the humidity of the exhaust air are measured and used for the supervision or regulation of the planned treatment process.

The measuring device 10 has two moisture testers 20, 21 for measuring, on the one hand, the moisture of the inlet air and, on the other hand, the moisture of the exhaust air. The signals developed by the two moisture testers are fed to the signal comparator 23.

In the fluid column installation 1 according to FIG. 1, the inlet air moisture tester 20 is arranged near the air inlet 11 to the inlet air pipe 7, in which there are accessory elements for influencing such factors as the inlet air temperature and the amount of inlet air. Here, the exhaust air moisture tester 21 is arranged above the treatment area 3 and before the filter 6, located behind the treatment area 3 in the direction of flow. If necessary, it would also be possible to arrange the moisture tester 21 near the exhaust air pipe 8 or behind the suction fan 9. However, the arrangement before the filter 6, near the treatment area 3, as shown, has the advantage that the measuring data obtained is practically unaltered.

The measured results from the testers 20, 21 are fed to the signal comparator which compares the signals and produces output signals through control leads 22 to the accessory elements which influence the conditions of the flow through air. It is possible, e.g., to control accessories (heater, fan, etc.) belonging to the inlet air pipe 7 or, as indicated by the dotted line, even the suction fan 9. There is also the possibility to change the spray rate of the spray liquid from the nozzle 5. According to FIG. 2, the control lead 22, as mentioned, can be connected to the spray installation 15 and/or to a conveyer means for the material feed 14.

According to FIG. 3, the drying process in the drying cabinet 16 may be supervised by the signal comparator 23 whereby, on the one hand, a supervision of the end of the drying process (possibly with a predetermined remaining moisture) is possible and, on the other hand, the outflow of moisture during a certain unit of time (especially during the drying process) can be controlled, so that faster or slower drying, depending on the goods to be dried, can be planned and supervised or regulated. In FIG. 3, a separate signal regulator 43 is connected behind the signal comparator 23, which can be connected to accessory elements for adjusting the inlet air conditions to regulate the drying process.

Figure 5:
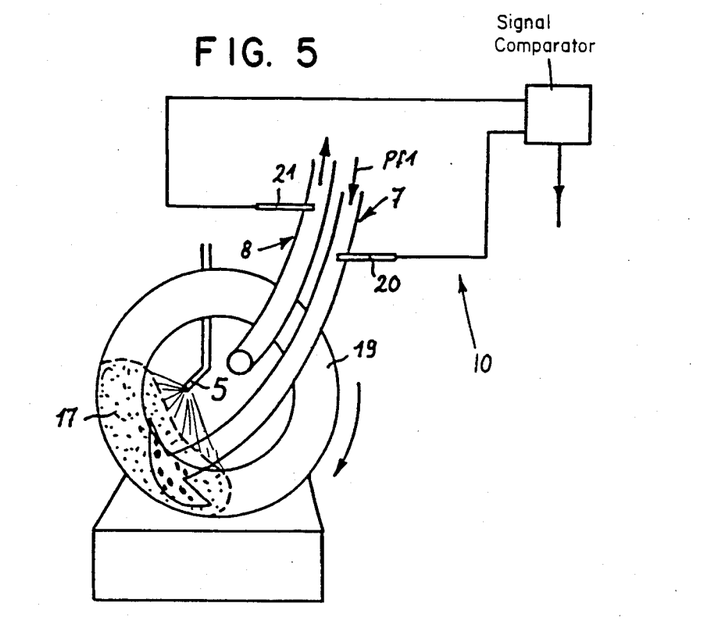
FIG. 5 is a schematic representation of another dragee making and film coating installation with a different air flow, as compared to FIG. 4.
Figure 6:
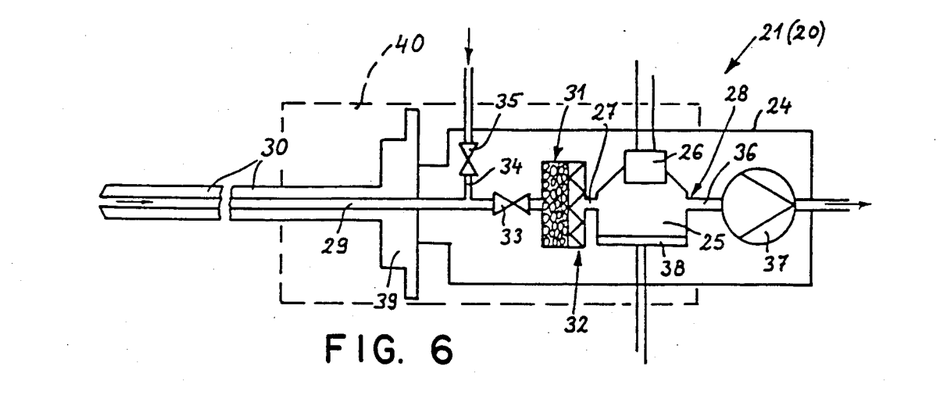
FIG. 6 is a schematic representation of a bypass flow moisture tester.

FIGS. 4 and 5 show installations with dragée making and film coating kettles 19, in which also, in each case, an inlet air moisture tester 20 and an exhaust air moisture tester 21 are provided. Especially the exhaust air moisture tester 21 is constructed as a bypass flow moisture tester (FIG. 6) and placed in an explosion proof housing 24. Such a moisture tester can also be used with the often present explosion proofing provisions. FIG. 6 shows a possible, slightly schematic representation of such a bypass flow moisture tester. In an explosion proof housing 24, the tester has a measuring chamber 25, into which reaches a measuring probe 26, and which has a gas inlet 27 and a gas exit point 28.

The gas inlet 27 has a gas pipe 29 within the housing 24 and also within an aspiration immersion pipe 30. Within gas pipe 29 and before measuring chamber 25, there is a flame trap 31 and an adjoining filter 32. Before the flame trap 31 there is a shuttle valve 33, and on the connecting side of this shuttle valve 33, which is removed from the measuring chamber, a blow-off pipe 34 is provided. The blow-off pipe is provided with a shuttle valve 35. At the gas exit point 28 away from the measuring chamber 25, a pipe 36 with suction pump 37 is connected.

During operation, the shuttle valve 35 is closed and the shuttle valve 33 is opened. The suction pump 37, through the gas inlet 29, either continuously or intermittently, sucks the gas which is to be tested for its moisture content. The preferably capacitive measuring probe 26 in the measuring chamber 25 then determines the humidity content or dew point of the gas.

As shown in FIG. 6, it is possible to provide the measuring chamber 25 with a heating device 38, which can be used to raise the temperature for over-saturated air to be measured, so that a corresponding dew point shift occurs. This shift can be corrected by a corresponding measuring correction, so that the determined measuring data refers again to the measured air at the original lower temperature, which, however, is not necessary for the sole measuring of the exhaust air charge.

For cleaning the gas inlet pipe 29, the shuttle valve 33 is closed and the shuttle valve 35 is opened so that a suitable rinse stream can remove humidity, dust particles, and the like. In order to satisfy safety requirements for explosion protection, the housing 24 of the bypass flow moisture tester 21 can contain an explosion protection gas, such as nitrogen.

The bypass flow moisture tester 21, together with the measuring chamber 25, the suction pump 37, the valves 33 and 35, the flame trap 31 and the like, form a compact construction unit. The explosion proof housing 24 also has a connection flange 39, through which is led the aspiration immersion pipe 30, and with which the bypass flow moisture tester can be attached to the planned measuring area, even at a later time. The described construction and arrangement of elements in the moisture tester provide for an intrinsically safe construction, which makes its use possible in the described treatment processes, where there is the possibility of increased danger from explosion. In FIG. 6, in the area of the gas inlet pipe 29, there is a heating element 40 shown in a dotted line, which could be used to avoid condensation in the area of the gas inlet pipe.

Figure 7:
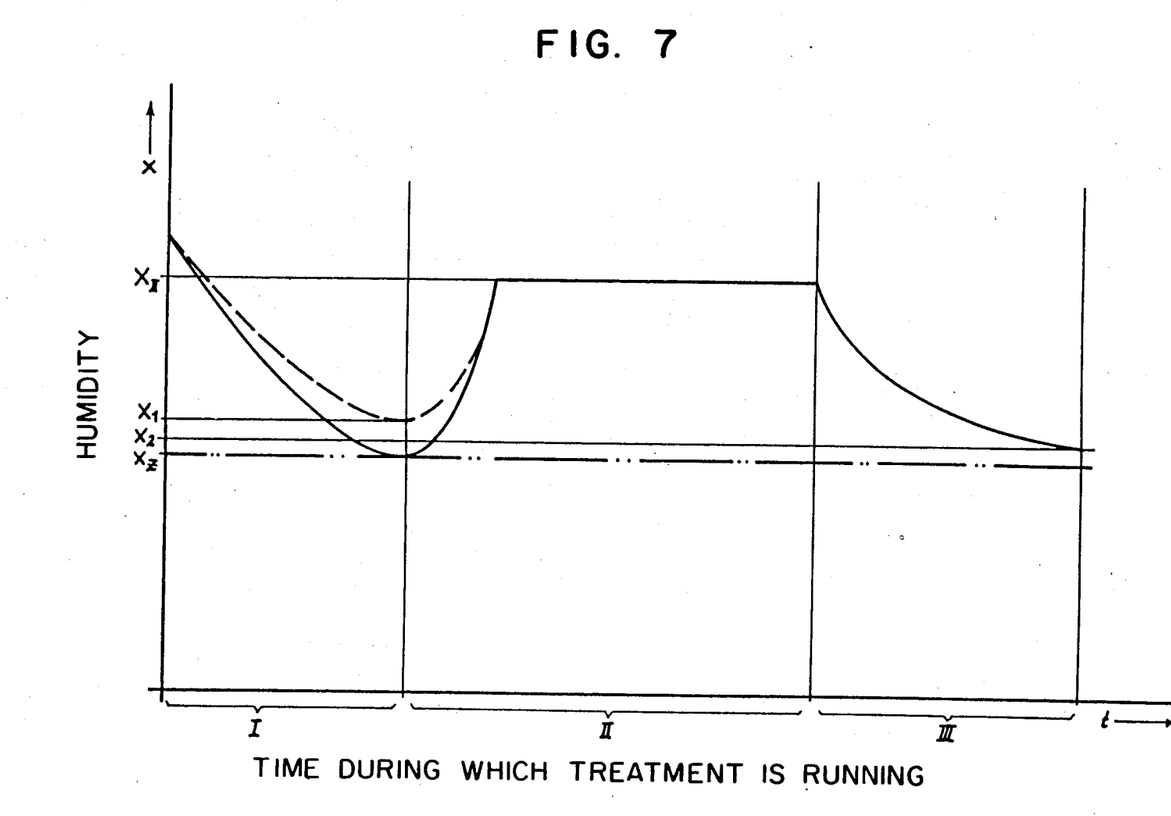
FIG. 7 is a diagram of the humidity process during a treatment process.

FIG. 7 shows a schematic diagram for a possible course of the humidity content in the inlet air and exhaust air. On the abscissa is shown the time during which a treatment is running, while the ordinate shows the humidity content. No specific time frame is shown since the actual time will vary from process to process. Suffice it to say at this point, the treatment for explanation purposes is divided into three time segments I, II and III. In time segment I, a pre-drying process takes place until the humidity of the exhaust air reaches a planned humidity content value $X_1$, so that the dashed line curve results, or the predrying is done so long that there is no more humidity charge in the exhaust air, i.e., the inlet air and the exhaust air contain the same humidity value. In the current example it is assumed that the condition of the humidity remains approximately constant at the value $X_Z$ during the whole treatment time. However, it has to be understood that, even with changing conditions of the inlet air, the formation of a differential value between the inlet air humidity and the exhaust air humidity, according to the invention, permits an unbiased, exact statement about the treatment process. It is possible that the time segment for pre-drying is followed by a spray granulation, a sugar dragée making or a film coating process that takes place in time segment II. By this treatment, the humidity in the exhaust air is raised to a value of $X_{11}$, which should remain constant, as desired in this example. In this case it is less the absolute humidity value which is of interest, but rather the humidity change, i.e., the difference between the humidity of the inlet air and the humidity of the exhaust air, as this difference provides information about the humidity of the charge resulting from the treatment. Variations in the humidity of the inlet air can be evened out by corresponding regulation, e.g., by influencing the inlet air or the spray rate.

After time segment II comes treatment segment III, in which a second drying takes place. There, drying can be done again to a limiting value of $X_2$. Because it is possible to register the humidity charge of the exhaust air, relative to the humidity charge of the inlet air, the drying process can be continuously supervised and, if necessary, corrected. If, e.g., an adding calculator is used, it is possible to also draw conclusions, within a narrow margin of error, on the total amount of removed water.

The measuring device 10 according to the invention permits an exact execution of the process, whereby a considerable advantage is presented by the fact that an exact duplication of the course of the process can be attained, so that the final product remains at a constant level of quality. It is especially possible to avoid the feared under-drying, by which delicate pharmaceutical or chemical products can be damaged.

It should also be understood that, especially during the drying process, not only the beginning and end values can be registered and evaluated, but it is also possible to supervise and regulate the drying speed, which is the amount of drying during a certain time period, so that energy costs can be reduced and the drying process possibly shortened. Another essential advantage is given by the fact that auxiliary data for the process, such as temperature, time elapse, etc., are unimportant during the course of the process, so that control costs, especially in view of planned automation, are considerably reduced.

Under certain circumstances for a granulating process, the present invention could also be of advantage, only to register the exhaust air humidity, because during the granulation process the highest possible humidity charge in the work area is planned. By measuring the exhaust air humidity, this humidity value, preferably just below the dew point, can be influenced by corresponding variations, especially by the spray rate.

Figure 8A:
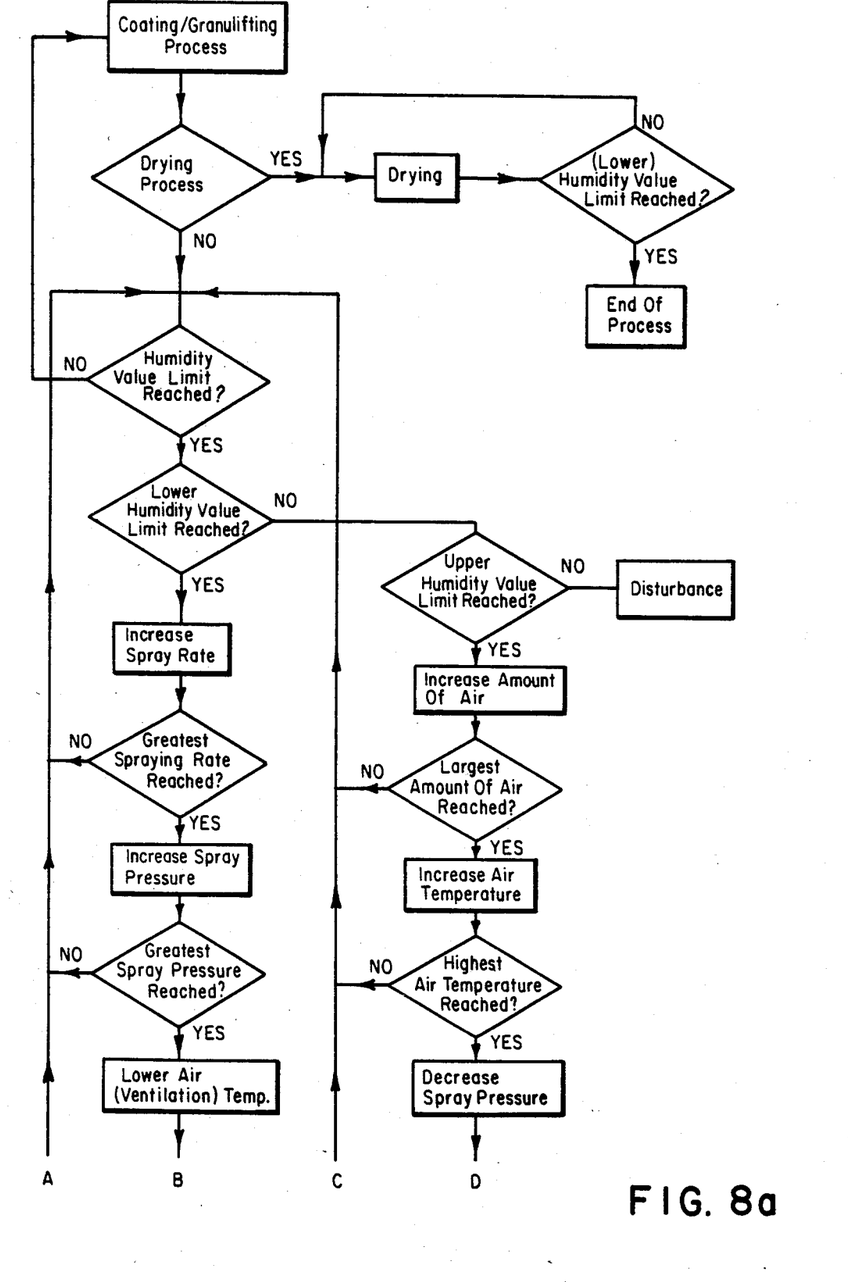
FIG. 8a is the first part of a flow diagram of a possible process incorporating the teachings of the present invention.
Figure 8B:
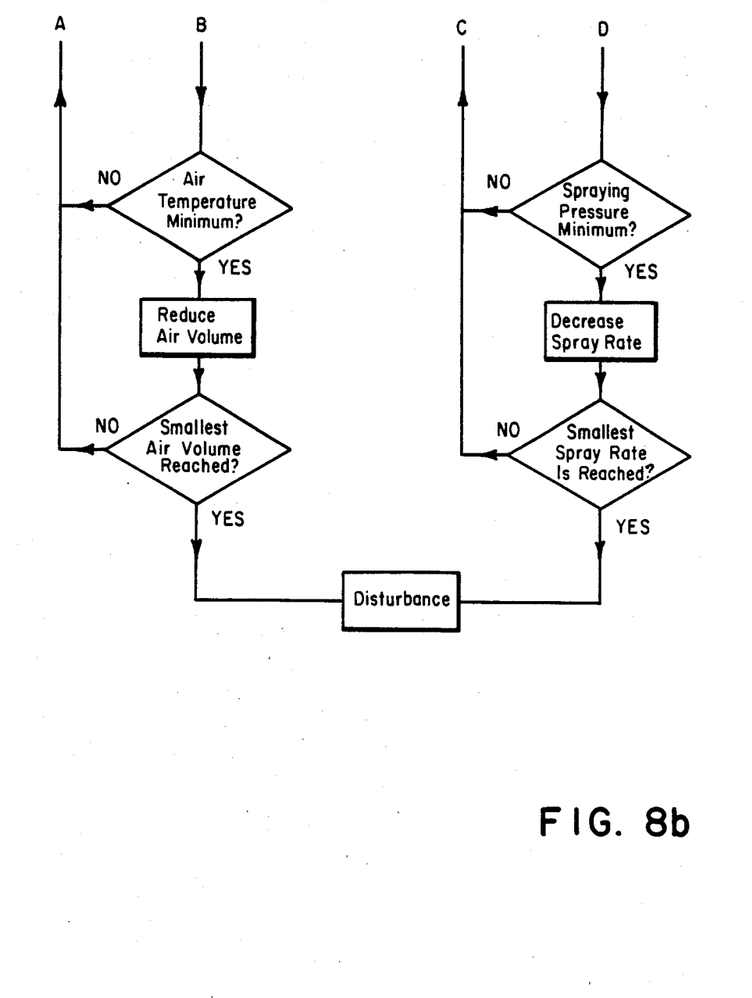

The partial FIGS. 8a and 8b show a flow chart, in which the essential course of a dragée making process, a granulating process or a similar process with subsequent drying is shown. During the dragée making process or granulating process, as long as the drying process has not been initiated, the humidity in the treatment area is kept between upper and lower limits. If one of the upper or lower limiting values of humidity is reached, several options are available for getting from this limiting value back to the acceptable range of humidity. In the flow chart shown as example, the left branch after the block "humidity value limit reached?" shows the measures as they are provided in sequence if the lower limiting value is reached. The right branch, on the contrary, shows the sequence of measures which are provided in case the upper limiting value of humidity is reached.

During a continuing dragée making or granulating process, as long as the drying process has not been started, the existing humidity of the air is supervised by an upper and a lower limiting value. If, e.g., the lower limiting value of humidity is reached, the first countermeasure will be to increase the spray rate. This is continued until the measured humidity is no longer near the lower limiting value of humidity. However, if the continuous increase of the spray rate is not enough to bring the humidity value away from the lower limit, and if the highest spray rate has been attained, the next measure for raising the humidity is an increase in the spray pressure. This again continues until the humidity value returns to within the prescribed limits. When reaching the highest possible spray pressure, the inlet air temperature can be lowered and finally the amount of air reduced, in order to raise the humidity at the desired rate. The sequence of these steps has proven especially advantageous for the process and particularly also for the product.

The steps for reaching the upper limiting value of humidity run in the reverse order as described above, whereby first the amount of air is increased, then the temperature of the inflow air raised, the spray pressure reduced and finally the spray rate reduced. The transition to the next following step only takes place when the previous step can no longer be changed. It should also be stated that, in a variation to the illustrated flow chart, other logical reversals and linkings can be planned, which have been left out here for a simpler and clearer illustration. When the actual dragée making or granulating process is concluded, a drying process follows, during which drying can take place up to a lower limiting value of humidity. When this value is reached, the treatment process is finished.

The described method and apparatus according to the present invention also make it especially plausible that the agglomeration of powders into granules can only be done in a repeatable manner and according to the requirement of each case, if the humidity bed can be controlled through the activity of the water. This is possible by the exact measurement of the dew point which permits a direct statement of absolute humidity. It is also essential that the controlled humidity during the treatment processes permit a conclusion on the humidity charge of the product. Besides, in physical treatment processes, it is also important during biological processes that the management of the water is correct. Such a process can serve, e.g., for the production of alcohol, which comes from a reaction or processing of sugar solution with yeast bacteria in a fluid column. Humidity content is especially important in this process for the life of the yeast bacteria, or rather for their activity. Tests have shown that even changes in air humidity of only a few percent lead to disturbances. It should also be understood that it is possible to supply already conditioned inlet air with exactly known data, instead of supervising the inlet air by a moisture tester 20.

Obviously, many modifications and variations of the present invention are possible in light of the above teachings, and it is contemplated that the subject invention may be practiced otherwise than as specifically described.

We claim:

1. A method for supervising and/or guiding of physical treatment processes and bioreactions in ventilation systems, in which inlet air or gas is fed in and exhaust air or gas is expelled, and in which a product is being processed, said method comprising the steps of:
   establishing a fluidized bed in which the product to be treated is suspended by a flow of fluidizing inlet air supplied to a vessel;
   spraying an aqueous solution on the product while it is in the fluidized bed;
   measuring the humidity of the inlet air;
   measuring the humidity of the exhaust air;
   comparing the humidity of the exhaust air with the humidity of the inlet air; and
   altering certain process conditions, including at least one of the quantity of spraying solution, the temperature of the inlet air, and the volume of inlet air, the alteration of process conditions based on the humidity comparison to regulate the humidity of the product being processed, wherein the altering step is carried out to first alter the quantity of spraying solution, then the temperature of the inlet air, if necessary, and then the volume of inlet air, if necessary in that sequence, to regulate the humidity of the product being processed.

2. The method according to claim 1, wherein the process conditions to be altered include those conditions which influence the humidity of the product during the treatment process.

3. The method according to claim 1, further comprising the step of holding the humidity of the exhaust air at a predetermined value.

4. The method according to claim 3, wherein said predetermined value is near the dew point.

5. The method according to claim 1, wherein the absolute humidity of at least one of the exhaust air and the inlet air is measured and used for guiding said certain process conditions.

6. The method according to claim 1, said method further comprising the steps of keeping the amount of air streaming through and the spray rate during appropriate time segments approximately constant and controlling the temperature of the inlet air depending on the humidity of at least the exhaust air.

7. The method according to claim 1, said method further comprising the steps of keeping the amount of air streaming through and the spray rate during appropriate time segments approximately constant and controlling the temperature of the inlet air depending on the difference in humidity between the inlet air and the exhaust air.

8. The method according to claim 1, said method further comprising the steps of keeping the amount of air streaming through and the temperature of the inlet air during appropriate time segments approximately constant and controlling the spray rate depending on the humidity of at least the exhaust air.

9. The method according to claim 1, said method further comprising the steps of keeping the amount of air streaming through and the temperature of the inlet air during appropriate time segments approximately constant and controlling the spray rate depending on the difference in humidity between the inlet air and the exhaust air.

10. The method according to claim 1, said method further comprising the steps of keeping the spray rate and the temperature of the inlet air during appropriate time segments approximately constant and controlling the amount of air flowing through depending on the humidity of at least the exhaust air.

11. The method according to claim 1, said method further comprising the steps of keeping the spray rate and the temperature of the inlet air during appropriate time segments approximately constant and controlling the amount of air flowing through depending on the difference in humidity between inlet air and exhaust air.

12. The method according to claim 1, wherein the process being supervised includes a drying treatment, and wherein the difference in humidity of inlet air and exhaust air is used to indicate the water loss per unit of time in the product being processed.

13. The method according to claim 1, wherein said method further comprises the steps of comparing the difference in humidity between the inlet air and the exhaust air against upper and lower limiting values and changing at least one of the spray rate, the inlet air temperature, and the inlet air amount to maintain the difference in humidity within said upper and lower limiting values.

14. The method according to claim 1, wherein the process being supervised includes pre-drying the product and said method further comprises the steps of measuring, during pre-drying, the difference in humidity between the inlet air and the exhaust air, determining when the difference in humidity is within a preselected range, holding the exhaust air humidity constant at a preselected humidity value, and carrying out a second drying process.

15. A device for supervising and/or guiding of physical treatment processes and bioreactions in a ventilation system in which inlet air or gas is fed in and exhaust air or gas is expelled, said ventilation system including a treatment area having an exit through which said exhaust air passes, said device comprising:

means for establishing a fluidized bed in the treatment area between an air inlet and an air outlet by passing air into the inlet and exhausting air through the outlet;

means for spraying a solution into the fluidized bed;

first measuring means for measuring the humidity of the exhaust air;

second measuring means for measuring the humidity of the inlet air;

means for comparing the humidity of the exhaust air with the humidity of the inlet air; and means for altering certain process conditions, including at least one of the quantity of spraying solution, the temperature of the inlet air, and the volume of inlet air, the alteration of process conditions based on the humidity comparison to regulate the humidity of a product being processed, wherein said first measuring means is housed in an explosion proof housing.

16. The device according to claim 15, wherein said first measuring means is a dew point tester.

17. The device according to claim 15, wherein said first measuring means includes a measuring chamber and means for registering absolute humidity.

18. The device according to claim 15, wherein the housing of the bypass flow moisture tester is filled with an explosion proof gas.

19. The device according to claim 15, wherein said moisture tester for the exhaust air is arranged in the exit area of the treatment area.

20. A device for supervising and/or guiding of physical treatment processes and bioreactions in a ventilation system in which inlet air or gas is fed in and exhaust air or gas is expelled, said ventilation system including a treatment area having an exit through which said exhaust air passes, said device comprising:

means for establishing a fluidized bed in the treatment area between an air inlet and an air outlet by passing air into the inlet and exhausting air through the outlet;

means for spraying a solution into the fluidized bed;

first measuring means for measuring the humidity of the exhaust air;

second measuring means for measuring the humidity of the inlet air;

means for comparing the humidity of the exhaust air with the humidity of the inlet air; and means for altering certain process conditions, including at least one of the quantity of spraying solution, the temperature of the inlet air, and the volume of inlet air, the alteration of process conditions based on the humidity comparison to regulate the humidity of a product being processed, wherein said first measuring means includes a measuring chamber, means for registering absolute humidity, and a heating means mounted in said measuring chamber of said moisture tester.

21. A device for supervising and/or guiding of physical treatment processes and bioreactions in a ventilation system in which inlet air or gas is fed in and exhaust air or gas is expelled, said ventilation system including a treatment area having an exit through which said exhaust air passes, said device comprising:

means for establishing a fluidized bed in the treatment area between an air inlet and an air outlet by passing air into the inlet and exhausting air through the outlet;

means for spraying a solution into the fluidized bed;

first measuring means for measuring the humidity of the exhaust air;

second measuring means for measuring the humidity of the inlet air;

means for comparing the humidity of the exhaust air with the humidity of the inlet air; and means for altering certain process conditions, including at least one of the quantity of spraying solution, the temperature of the inlet air, and the volume of inlet air, the alteration of process conditions based on the humidity comparison to regulate the humidity of a product being processed, wherein said first measuring means includes a measuring chamber and means for registering absolute humidity, and further comprising a capacitive measuring probe reaching into said measuring chamber of said first measuring means, said measuring chamber having a gas inlet as well as a gas exit, and a flame trap is positioned near said gas inlet.

22. The device according to claim 21, wherein said measuring chamber has an inlet, and wherein said device further comprises rinsing means within said inlet, a shuttle valve mounted inside said gas inlet, upstream of said flame trap, a blow-off pipe connected to said shuttle valve, and a pipe valve connected to said blow-off pipe.

23. The device according to claim 22, wherein the measuring chamber, the suction pump, the valves, the flame trap, and the filter form a construction unit and are housed in a common housing, preferably provided with a connection flange.

24. The device according to claim 21, further comprising a filter mounted in the gas inlet of the measuring chamber.

25. The device according to claim 24, wherein said filter is mounted before said flame trap.

26. A device for supervising and/or guiding of physical treatment processes and bioreactions in a ventilation system in which inlet air or gas is fed in and exhaust air or gas is expelled, said ventilation system including a treatment area having an exit through which said exhaust air passes, said device comprising:

means for establishing a fluidized bed in the treatment area between an air inlet and an air outlet by passing air into the inlet and exhausting air through the outlet;

means for spraying a solution into the fluidized bed;

first measuring means for measuring the humidity of the exhaust air;

second measuring means for measuring the humidity of the inlet air;

means for comparing the humidity of the exhaust air with the humidity of the inlet air; and means for altering certain process conditions, including at least one of the quantity of spraying solution, the temperature of the inlet air, and the volume of inlet air, the alteration of process conditions based on the humidity comparison to regulate the humidity of a product being processed, wherein said first measuring means includes a measuring chamber having a gas inlet and a gas exit and wherein said device further comprises a heater, positioned in the area of the gas inlet.

27. The device according to claim 26, further comprising a suction pump connected near the gas exit of the measuring chamber.

* * * * *